Sept. 25, 1923.
L. F. STAFFORD
1,468,757
BUMPER ATTACHING BRACKET
Original Filed Feb. 6, 1922    2 Sheets-Sheet 2
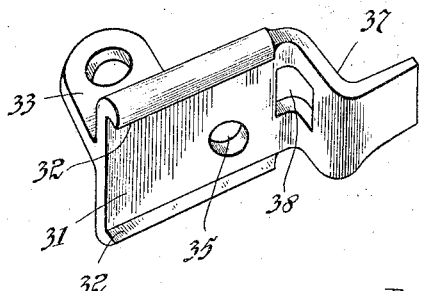
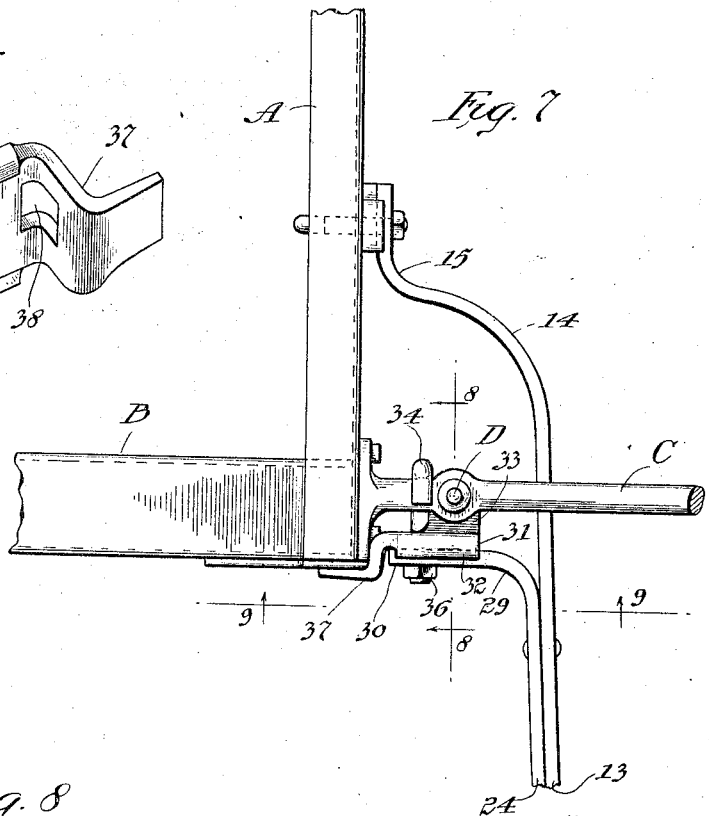
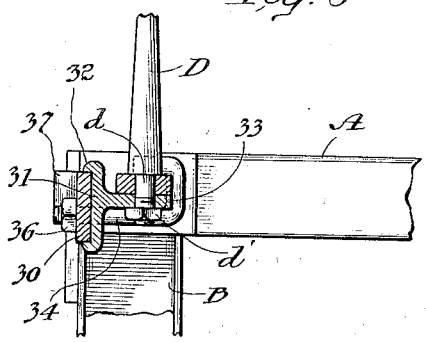
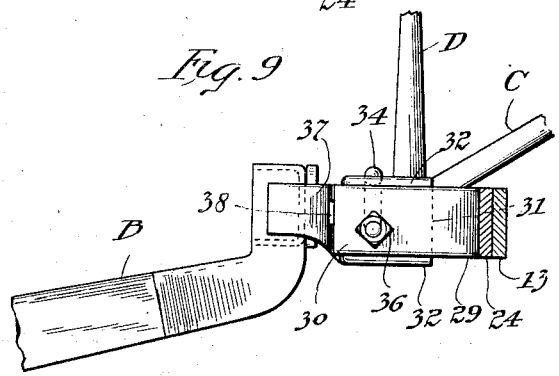
Inventor:
Lewis F. Stafford
By Benjamin, Woodhouse & Lundy
Attys Patented Sept. 25, 1923.

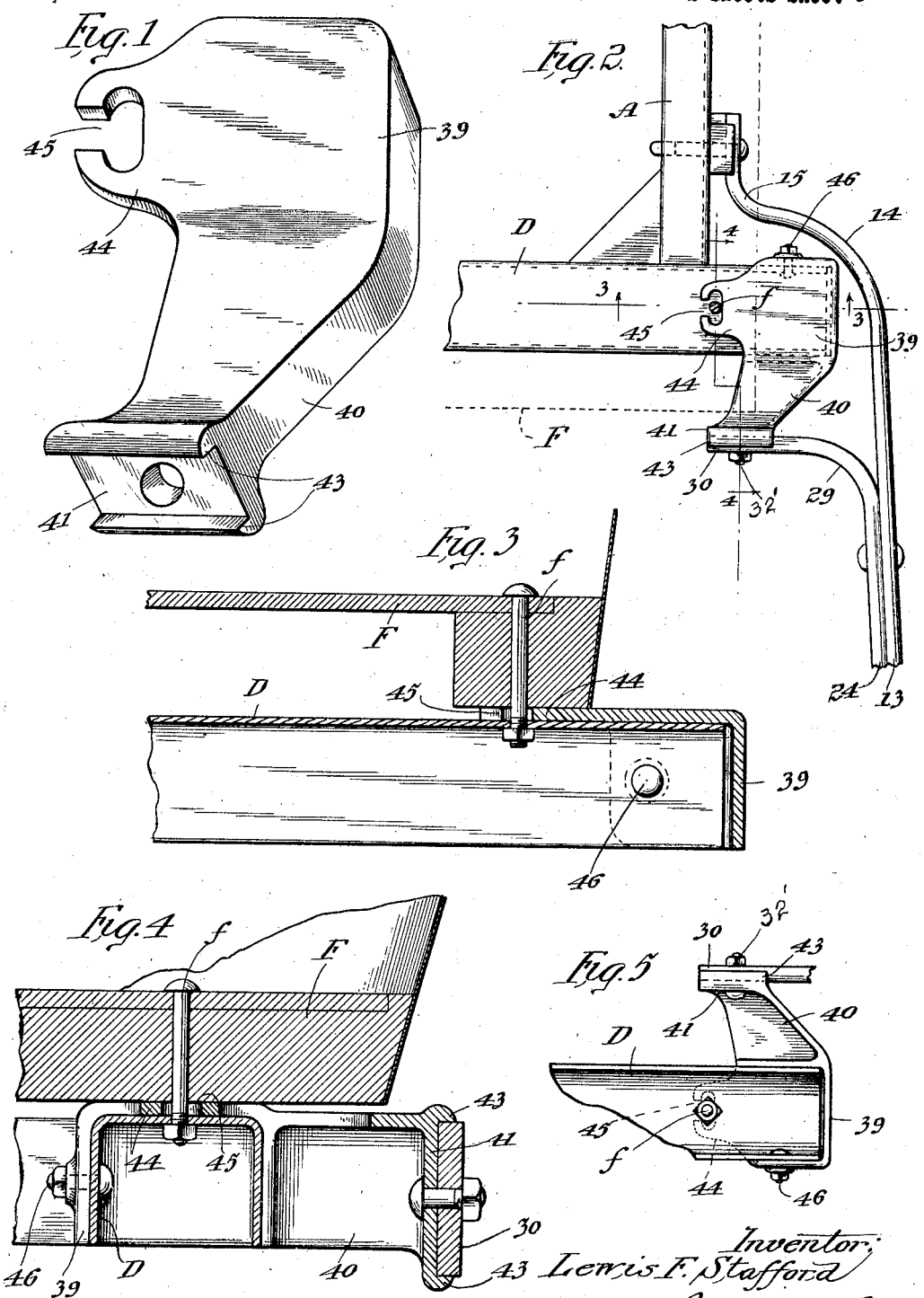

1,468,757

UNITED STATES PATENT OFFICE.

LEWIS F. STAFFORD, OF CHICAGO, ILLINOIS, ASSIGNOR TO STAFFORD SPRING GUARD CO., OF CHICAGO, ILLINOIS, A CORPORATION OF ILLINOIS.

BUMPER-ATTACHING BRACKET.

Original application filed February 6, 1922, Serial No. 534,581. Divided and this application filed July 24, 1922. Serial No. 576,915.

*To all whom it may concern:*

Be it known that I, LEWIS F. STAFFORD, a citizen of the United States, residing at Chicago, in the county of Cook and State of Illinois, have invented a new and useful Improvement in Bumper-Attaching Brackets, of which the following is a specification.

My invention relates generally to means for attaching bumpers to automobiles and similar vehicles, and has been more particularly designed for application to the chassis or body or other parts of a Ford automobile.

The specific object of my invention resides in providing a structure for a Ford automobile that may be quickly attached to the chassis or other standard part of the vehicle without any preliminary work upon the vehicle and without the necessity of using any special tools. Another object resides in the provision of a structure that shall be extremely rigid as regards its attachment to the vehicle so that the tendency to loosen is reduced to a minimum, and in this connection I have designed my attaching brackets so that the arms of the bumper may be secured thereto when shipped from the manufacturer to the user who may then attach the structure to the vehicle in a few minutes. Another object is to provide a bracket that has an element to engage the end of the chassis frame at the corner of the latter so that the stress received by the bracket from the bumper arm will be transmitted longitudinally to the side-sill of the chassis. I have designed my attaching brackets so that they may be secured to the vehicle by means of bolts and nuts already on the Ford automobile as standard parts thereof and which therefore permit of the securing of the bumper to the vehicle by persons having little or no mechanical skill. Also, I have provided a bumper bracket that is dependable in performing its functions, durable in construction and which is economical to manufacture so that it may be sold to the user for a moderate price. All the foregoing objects I accomplish by the means and in the manner hereinafter described, and as more particularly set forth in the appended claims.

The drawings, it will be understood, are merely diagrammatical for the purpose of illustration, and by referring thereto it will be seen Fig. 1 is a perspective of one type of my bracket used at the rear of a Ford chassis frame.

Fig. 2 is a top plan of a rear corner of a Ford chassis showing the use of my bracket.

Fig. 3 is a vertical section on line 3—3, Fig. 2.

Fig. 4 is a vertical section at a right angle to Fig. 3 and taken on line 4—4, Fig. 2.

Fig. 5 is a bottom plan of the structures shown in Figs. 3 and 4.

Fig. 6 is a perspective of a modified type of bracket used at the front of a Ford chassis.

Fig. 7 is a top plan of a front corner of the chassis showing the modified bracket in use.

Fig. 8 is a vertical section taken on line 8—8, Fig. 7.

Fig. 9 is a front elevation of the structure illustrated in Fig. 7.

While it is obvious the structure herein disclosed may be employed in connection with other types of bumpers and other makes of vehicles, I prefer to use the same with the bumper device described and illustrated in my co-pending application for United States Letters Patent, which was filed February 6, 1922, Serial No. 534,581, of which this present application is a division, and which is especially designed for both front and rear of a Ford automobile.

The arms 13 of my bumper are spaced apart wider than the distance between the side-sills A of the Ford chassis, and in order to give the arms more elasticity their end portions are bent in a relatively wide curve 14 laterally inwardly toward the sills and then given a short bend 15 so as to dispose the ends of the arms parallel alongside the vertical web of the channel side-sills. The arms 24 of the supplementary supports for the main bumper lie alongside arms 13, and at about the plane of the end-sill are bent away from these arms, as at 29, so that their ends terminate in straight lateral portions 30. This permits arms 13 and 24, respectively, to be connected to the chassis at spaced points upon each side of the chassis frame and at both ends of the latter for front and rear bumpers.

At the forward end or front of the chassis of the Ford automobile, side-sills A are connected by a drop-frame end sill B and extending laterally from the ends of the side sills in an upwardly inclined direction is the mud-guard or fender bracket C that has a vertically disposed lamp bracket or standard D arising therefrom. From the lower end of the lamp bracket extends a threaded stud *d* of reduced diameter that passes through an aperture in the fender bracket and is secured in place by a nut *d'* secured on to its extended end, and, as seen in Fig. 8, I utilize this structure for securing the adjacent ends of the supplementary supports to the chassis. At their ends nearest the chassis the supplementary supports are given spring bends 29 that terminate in straight end portions 30 extending inwardly towards each other and laterally to the straight portions of the supplementary supports. The bracket for securing these elements to the vehicle is illustrated in Fig. 6 and comprises a straight plate 31 having upper and lower flanges or ribs 32 that form a channel to receive portions 30 of the supports, while the opposite face of said plate has an apertured lug 33 through which stud *d* of lamp bracket D is passed after removing nut *d'*. Upon replacing and tightening the nut the lamp bracket and the bumper attaching plate 31 are secured in position. The shank of a hook-shaped bolt 34 is passed through an aperture 35 in the plate and an alining aperture in portion 30 of support 24, and after the curved end of this bolt has been hooked around the fender bracket C, nut 36 is tightened upon the threaded shank of the bolt which secures portion 30 to the plate and affords additional means for securing said plate 31 to fender bracket C. A substantially L-shaped extension 37 is provided upon the end of plate 31 adjacent the corner of the chassis sills, the lateral member thereof that fits against the side of the chassis or fender bracket C having a rectangular aperture 38 to fit around the bolt or nut that secures said fender-bracket to the chassis, while the other member of the L-shaped extension is drawn against the end of the chassis by the tightening of hook-bolt 34, as shown in Fig. 7 of the drawings. Thus, the stress from the bumper arms which is received by the brackets is transmitted longitudinally to the chassis frame and to the side-sills thereof.

The bumper for the rear of the automobile is of the same shape and dimensions as that used for the front thereof, the bends and curves being made upon the same patterns or forms, hence, I have designated all of said corresponding parts by the same reference characters that have heretofore been employed in describing the respective elements. The brackets for connecting the straight lateral ends 30 of the supplementary supports to the chassis are, however, different in construction from that employed at the front of the vehicle, owing to the absence of the fender brackets at these points, but said rear brackets perform their functions in substantially the same manner as plates 31 with their L-shaped extensions 37 in that they extend upon the sides and ends of the corners of the chassis sills so that the blows received by an impact member of a bumper (not shown) will be transmitted through main arms 13 and the supplementary supports 24 longitudinally to the side-sills, respectively, at their sides and at their ends.

At the rear of the Ford chassis side-sills A are connected by a channel end-sill D having its ends extended beyond the ends of the side-sills and with its web uppermost in a horizontal plane, one flange having cut-away portions to arch over the side-sills, and body F of the vehicle is connected to this end sill by bolts *f* that pass through these parts and are secured in place by nuts. The bracket for connecting the straight portions 30 to the chassis comprises a casting, the chassis-engaging portion of which is a box-like structure 39 having the bottom and one vertical or side-wall removed so that it may be fitted over the extended ends of end-sill D. An arm 40 of angular cross-section extends obliquely rearwardly from end-sill D, and at the end of the arm the flanges thereof are connected by a transverse plate 41 of rectangular shape that is apertured to receive a bolt 32' that passes through the same and an alining aperture in the adjacent part of the straight portion 30 of the supplementary support. Upper and lower ribs or flanges 43 extend from the outer face of plate 41 between which the metal strap forming portion 30 is positioned. A laterally disposed horizontal ear 44 projects from the upper or top wall of the box-like portion 39 of the bracket in the outer edge of which is provided an open slot 45 which is preferably wider at its inner portion.

In assembling the bracket with the chassis the nut on body bolt *f* is loosened and body F is raised a short distance from the chassis whereupon the box-like portion 39 of the bracket is slipped upon the end of end-sill D with the open side of the box innermost which positions the shank of body bolt *f* in the inner portion of slot 45. The body is then lowered to position and the nut tightened on the bolt which clamps the top of the box between the body and the end sill, as seen in Figs. 3 and 4 of the drawings. This arrangement permits of a very rigid mounting of the bracket, and the walls of box 39 surrounding the end of sill D prevent the shearing of bolt *f* due to excessive stresses received from the impact portion of the bumper. Also the structure permits the bumper being quickly assembled with the vehicle without the use of special tools other than a wrench to operate the nut on body bolt $f$. If desired an aperture may be made in one of the vertical walls of the box-like portion of the bracket that lies against a vertical flange of the end sill and said flange is also bored so that a bolt 46 may be passed through said openings and tightened by a nut to prevent displacement of the bracket.

What I claim is:—

1. A bumper attaching bracket comprising a box-like structure open at its bottom, the top wall thereof adapted to be interposed between the vehicle body and the chassis and constructed to receive the device for securing the body to the chassis, and an element projecting from the box-like structure and constructed to receive the adjacent end of the bumper arm.

2. A bumper attaching bracket consisting of a channel shaped body arranged to receive an arm of a bumper, and an angular arm projecting from said body and interposed between the vehicle body and the chassis whereby to fit around and house an angular lateral extension of the chassis.

3. A bumper attaching bracket consisting of a body having three side-walls that fit the end portion of a lateral extension of a chassis frame, a top wall connecting said side walls adapted to be interposed between the vehicle body and the chassis frame, an angular arm projecting from one side of said body, a laterally disposed plate upon the end of said arm to receive a portion of the bumper, and a lug projecting from the top wall and having a recess coacting with the means that secure the vehicle body to the chassis frame.

4. A bumper attaching bracket comprising a box-like structure open at its bottom, the top wall thereof adapted to be interposed between the vehicle body and the chassis and constructed to receive the device for securing the body to the chassis, an arm projecting from the box-like structure, and a transverse plate at the end of said arm to receive the adjacent end of a bumper arm.

5. A bumper attaching bracket consisting of an element a portion of which is substantially L-shape in horizontal section; one of the arms thereof engaging the transverse end portion at a corner of the chassis and the other arm extending along the longitudinal side of the chassis whereby the angular portions of the corner of the chassis are engaged and a lateral plate extending from one of said arms to receive the end of a bumper arm.

6. A bumper attaching bracket consisting of an element a portion of which is substantially L-shape in horizontal section; one of the arms thereof engaging the transverse end portion at a corner of the chassis and the other arm extending along the longitudinal side of the chassis whereby the angular portions of the corner of the chassis are engaged, and a lateral plate extending from one of said arms; said plate being of channel shape in transverse section whereby to receive the end of a bumper arm.

LEWIS F. STAFFORD.